(12) United States Patent  
Sehnert

(10) Patent No.: US 6,651,887 B1  
(45) Date of Patent: Nov. 25, 2003

(54) READING AND INTERPRETING BARCODES USING LOW RESOLUTION LINE SCAN CAMERAS

(75) Inventor: William Sehnert, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/205,771

(22) Filed: Jul. 26, 2002

(51) Int. Cl.7 .................................................. G06K 7/10
(52) U.S. Cl. ........................... 235/462.16; 235/462.25; 235/462.01; 235/494
(58) Field of Search ................... 235/462.01–462.49, 235/494

(56) References Cited

U.S. PATENT DOCUMENTS

| | | | |
|---|---|---|---|
| 5,189,292 A | 2/1993 | Batterman et al. | 235/494 |
| 5,276,315 A | 1/1994 | Surka | 235/462 |
| 5,343,028 A | 8/1994 | Figarella et al. | 235/462 |
| 5,438,188 A * | 8/1995 | Surka | 235/462.07 |
| 5,487,115 A | 1/1996 | Surka | 382/296 |
| 5,489,767 A | 2/1996 | Billington | 235/437 |
| 5,504,319 A | 4/1996 | Li et al. | 235/462 |
| 5,642,442 A | 6/1997 | Morton et al. | 382/287 |
| 5,748,804 A | 5/1998 | Surka | 382/291 |
| 5,767,498 A * | 6/1998 | Heske et al. | 235/462.16 |
| 5,770,841 A | 6/1998 | Moed et al. | 235/375 |
| 6,513,714 B1 * | 2/2003 | Davis et al. | 235/462.16 |

FOREIGN PATENT DOCUMENTS

| | | | |
|---|---|---|---|
| EP | 569962 | 11/1993 | G06K/7/10 |
| EP | 1182604 | 2/2002 | G06K/9/32 |
| JP | 61052779 | 3/1986 | G06K/7/00 |
| JP | 7234913 | 9/1995 | G06K/7/10 |
| WO | WO9200576 | 1/1992 | G06K/19/06 |

\* cited by examiner

Primary Examiner—Thien M. Le  
Assistant Examiner—Daniel A. Hess  
(74) Attorney, Agent, or Firm—Carstens, Yee & Cahoon, L.L.P.

(57) ABSTRACT

A method is disclosed of decoding a code 39 barcode when distortion and noise are high, such as when a low-resolution line-scan camera is utilized. A window looks at five bars at a time to determine if they fit the requirements of a code 39 character, i.e., 3 narrow bars and 2 wide bars. The breakpoint between a narrow and wide bar is set at 75% of the width of the widest bar in the window. If the window does not match the requirements, the first bar is discarded and the window is moved down one bar. When a valid character is detected, it is stored and the window is incremented 5 bars.

21 Claims, 5 Drawing Sheets

SAMPLE BARCODE WITH BACKGROUND NOISE

SAMPLE BARCODE IMAGE WITH NARROW BARS
DISTORTED BY LOW RESOLUTION SAMPLING

READING AND INTERPRETING BARCODES USING LOW RESOLUTION LINE SCAN CAMERAS

BACKGROUND OF THE INVENTION

1. Field of the Invention

This invention relates generally to barcodes and, more particularly, to a method and computer program product for overcoming the inaccuracies inherent in a low-resolution line scan camera to correctly decode a barcode.

2. Background of the Invention

Barcodes have become a common part of the automatic recognition technology that enables a computer to accurately input information. There are a number of barcode schemes that have been devised for use in different industries and/or locations, and each scheme has its own rules.

For example, European Article Numbering (EAN) is the code most commonly used for numbering retail products in Europe. This code is entirely numeric, using only characters 0–9 and requiring two bars and two spaces to encode a single character. The coding itself is fairly complex, but has either thirteen or 8 digits, used as follows: country code (2–3 digits), manufacturer identification number (4–5 digits), product identification number (5 digits), and a one-digit check digit, which is required to be sure the barcode is correctly decoded. The Universal Product Code (UPC) used in the U.S. is a subset of EAN.

Other barcode systems include International Standard Book Numbering (ISBN), a subset of EAN used for books and ITF, a bar code that was developed for bulk packaging situations because EAN rules were not tolerant enough of print variations.

Code 39 is an alphanumeric barcode that was designed to eliminate the need for a check digit by making each character self-checking. The basic Code 39 contains the characters 0–9, A-Z, and-the symbols -, ., $, /, +, %, with "*" generally used as a start and stop character; an extended Code 39 set is also available, containing the entire ASCII character set.

The scheme for barcode 39 is illustrated in FIG. 1A. Barcode 100 represents the character string *123ABC*, as is shown below the barcode itself. For convenience of the reader in understanding, an equally spaced grid has been placed across the top of barcode 100 and a shaded area has been placed in the grid to mark divisions between characters. In code 39, nine elements are necessary for each character—five lines and four spaces, with a narrow space between characters. Each space or bar has one of two widths, with wide elements being twice as wide as the narrow elements. Of the nine elements in each character, three elements will be wide, the others narrow. FIG. 1B is a table showing the barcode representation of the basic Code 39 character set. Notably, all numbers, letters, and the characters "-", ".", " " (space), and "*" are coded by two wide bars and three narrow bars, with variations in the location of the one wide space. In the extended code, other variations within the 3 of 9 coding are added, such as two wide spaces, or three wide bars.

To be maximally efficient, a barcode must be read and decoded in a very short time. Whether the applications use a high-resolution camera for processing thousands of parcels an hour or a low-resolution camera to scan an item every few seconds, it is important to quickly read and decipher a code that may not be clearly reproduced.

FIGS. 2A and 2B show examples of pictures of barcodes made using a low-resolution line scan camera. Each of these drawings represents a small number of scan lines, with the apparent height of the barcode being stretched for improved visualization. The nature of the camera results in graininess of the picture and allows a large amount of noise (most clearly shown in FIG. 2A) and distortion (most clearly shown in FIG. 2B), with the distortion being especially noticeable in the narrow bars of a barcode. Since the picture is not very precise, software is an important component in reading the barcode.

One method of decoding a barcode is disclosed in U.S. Pat. No. 5,748,804, which is hereby incorporated by reference. In this patent, a low-resolution image is processed to produce a trace of the intensity of pixels across the barcode, such as the trace in FIG. 3A. Through scaling operations explained more fully in the patent, the peaks and valleys that do not span the full dynamic range of the signal are stretched to the limits of the dynamic range, producing a trace like that shown in FIG. 3B. Using the latter trace, the area of each region that is bounded by the dynamic limits and the signal is calculated, with areas 310, 312, 314 representing bars and areas 311, 313, 315 representing spaces. The widths of the bars and spaces in the barcode are calculated from the corresponding measured areas.

It has been difficult to find a reliable program that will consistently and correctly read barcodes that have been read by a low-resolution line-scan camera. It has been very desirable, therefore, to find a method of decoding barcodes that is more reliable with low-resolution cameras.

SUMMARY OF THE INVENTION

The inventor has discovered that the prior difficulties in reading a line-scanned barcode are caused by manipulating and decoding the barcode as a single entity. A novel method is presented that looks at one character of the barcode at a time. The method is described for barcodes based on Code 39, and uses the known structure of the barcode to reset a threshold value between wide and narrow bars for each character. A software filter is used to create a window that only "sees" one character at a time. A determination is made of the width W of the widest bar in the window. Based on this width W, a threshold T is set to 75% of W to distinguish between narrow and wide bars. Once each bar in the window is defined as narrow or wide, a determination is made whether the content of this window meets the coding scheme. Notably, if the application uses only the basic code 39 set without the "$", "/", "+" or "%", the coding scheme can be identified as having three narrow bars and two wide bars. If the window doesn't meet the coding scheme, the first "bar" is presumed to be an error, the window is moved to locate the next bar, and the process resumes with determining the widest bar in the window. If the window does meet the coding scheme, a character is decoded from the pattern in the window and stored as the next character in a decoded label. For each decoded and stored character, the window is incremented to the next character, i.e., it moves to the next five bars and again resumes with determining the widest bar in the window. Further refinements include checking to see if the valid character is a start/stop character. If so, the width of the entire character is determined and used to double check successive characters, ensuring that they are the correct width. The decoded label is check to ensure that it is completely decoded before the process can end. The fact that the threshold is recalculated for each succeeding window provides great flexibility in reading a wide range of barcodes.

BRIEF DESCRIPTION OF THE DRAWINGS

The novel features believed characteristic of the invention are set forth in the appended claims. The invention itself, however, as well as a preferred-mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 4A:
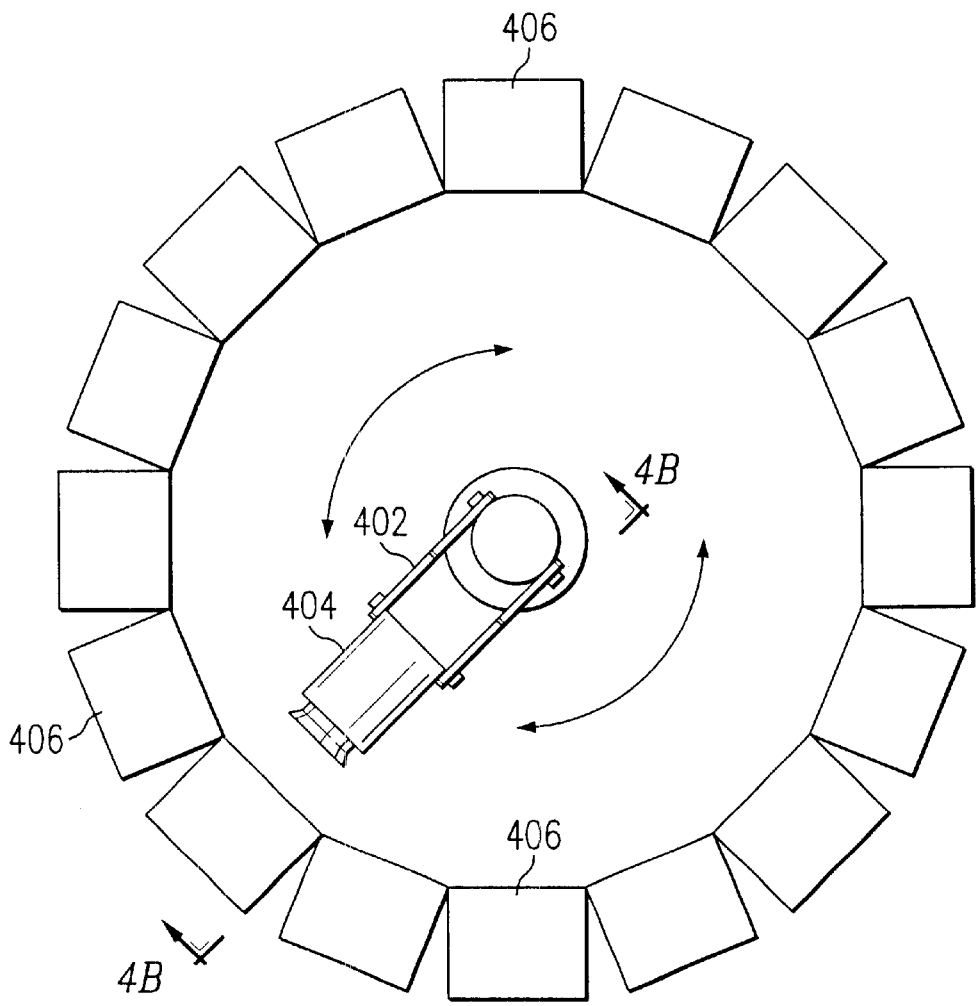
FIGS. 4A and 4B show respectively an overhead view of an automated tape library in which the decoding process is implemented and a side view of a robot arm containing a line-scan camera.
Figure 4B:
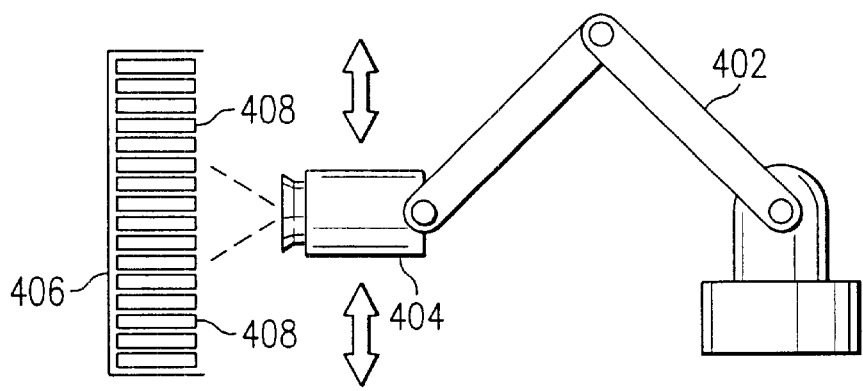

Referring now to FIGS. 4A and 4B, an automated tape library is disclosed in which the innovative decoding process is implemented. FIG. 4A shows an overhead view of a tape library according to an innovative embodiment of the invention. A robot arm 402 carrying a line scan camera 404 is surrounded by a number of storage racks 406 containing tape cartridges 408 and is mounted so that it can turn through 360 degrees of arc to access the tapes. FIG. 4B shows a view of the tape library taken along the dotted line A—A'. Robot arm 402 is jointed so that it can be raised or lowered to read barcodes on the front of each tape cartridge, and contains mechanisms with which to retrieve the cartridges. The robot arm 402 is programmed to move slowly down the storage rack, while camera 404 scans the expected location of the barcodes. As these locations are read, the pixel data is fed to a processor (not shown), where it is deciphered to find the correct tape. Once the tape is located, the robot arm will retrieve the tape to a user location, such as a tape drive (not shown).

In the presently preferred embodiment, a single scan line across the barcode is processed from the line scan camera at a time. This means that the sample of the barcode is a single pixel high. A software filter marks the boundaries between black and white, dividing the scan line into bars and spaces, and determine the widths of each bar and space. The software filter will then present a window containing only five bars and the intervening four spaces to the decoding program.

Figure 5:
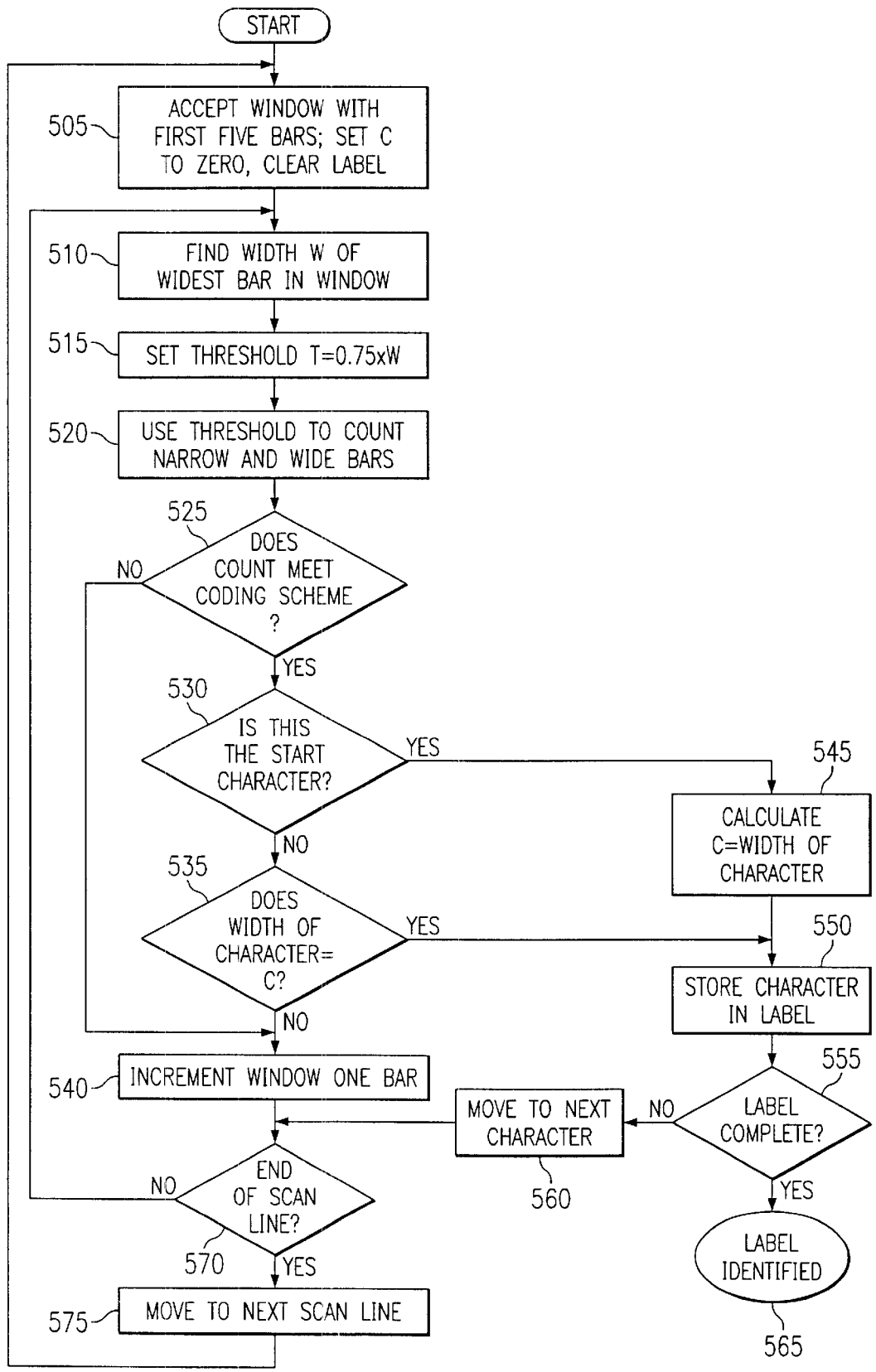
FIG. 5 shows a flowchart of the innovative process of decoding a barcode.

The decoding process is shown in FIG. 5. This algorithm starts with a window containing the first five bars (step 505) and sets the value C, which contains the width of a character, to zero. The process then determines the width W of the widest bar within the window (step 510). A threshold T is set equal to 75% of the width W (step 515). Threshold T can then be used to differentiate between wide and narrow bars.

The process then counts the wide and narrow bars in the window (step 520) to determine if it meets the standard for the code scheme (step 525). If not, the first black bar will be ignored as a presumed error. The window is moved one bar in a forward direction (step 540), so that it again contains five bars, and the algorithm returns to find the width of the current widest bar in the window (step 515).

If the code scheme is met, the algorithm checks to see if this is the start character (step 530); if so, the width of a character C is calculated (step 545) and the character is stored (step 550). If the character is not the start character, the width of the current character is checked against a previously determined width C to determine if the character is the proper width (step 535). A proper width character is stored as the next character in the label (step 550), but an improper width is treated as if the character had not met the standard for the expected code scheme, so that the first bar is thrown out, the window is moved one bar (step 540) and the algorithm returns to find the widest bar in the current window (step 515). Once a character is stored, the saved label number is checked to see if it meets the label-coding scheme (step 555). For code 39 applications, this would be a character string enclosed by the start/stop characters. If so, the label is identified (step 565), if not, the algorithm moves the window down a character, i.e., five bars (step 560) and resumes looking at the barcode, returning again to determine the widest bar in the current window (step 515).

Figures 1A, 1B:
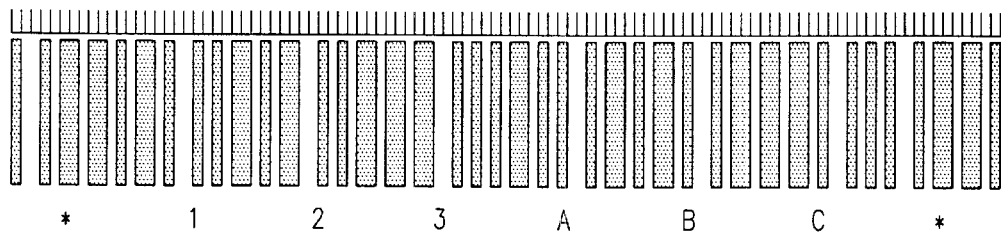
FIG. 1A shows an exemplary barcode using Code 39.
FIG. 1B shows a table giving the barcode pattern for the basic set of code 39 characters.
Figure 2A:
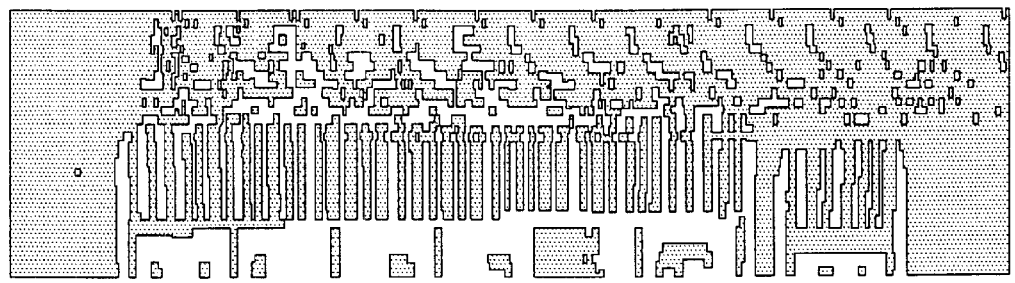
FIGS. 2A and B show examples of the noise and distortions that appear using a low-resolution camera to read the barcodes.
Figure 2B:
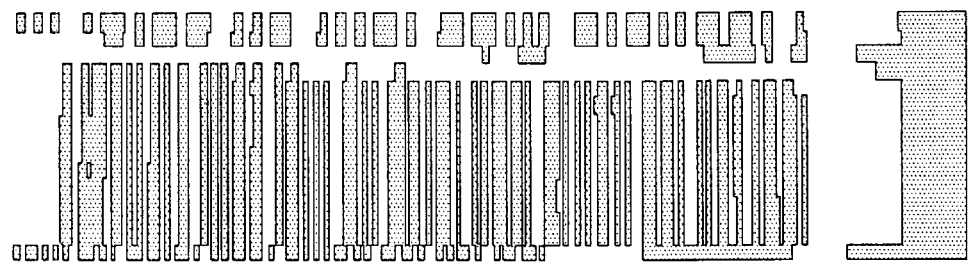
Figure 3A:
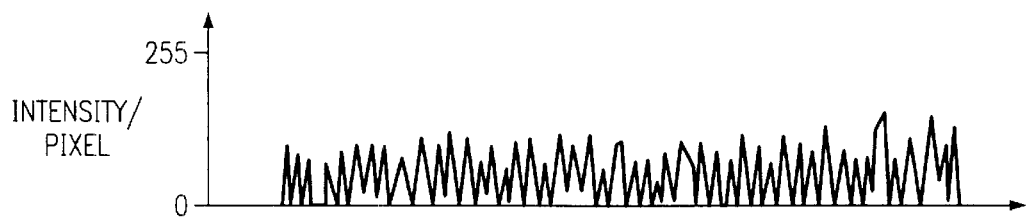
FIGS. 3A and B demonstrate steps in a prior art method of interpreting a barcode.
Figure 3B:
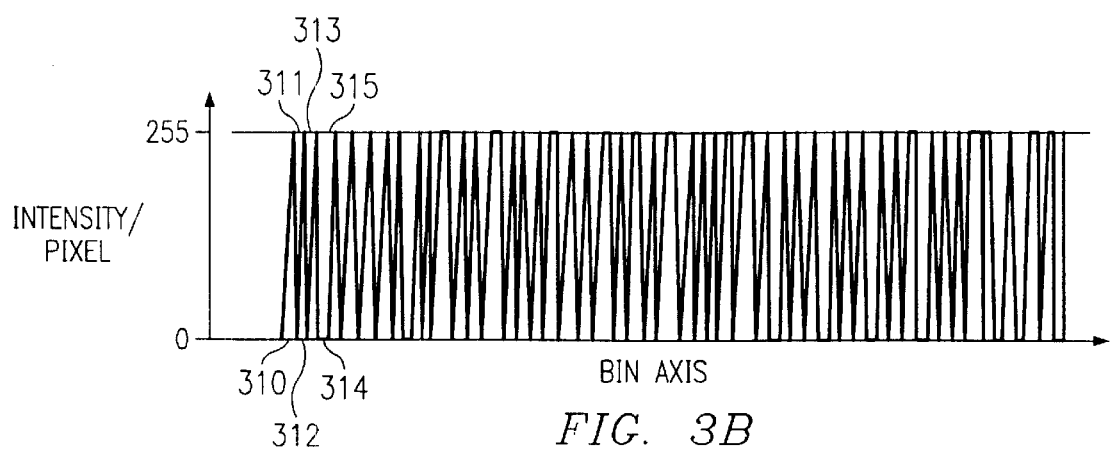
Figure 6:
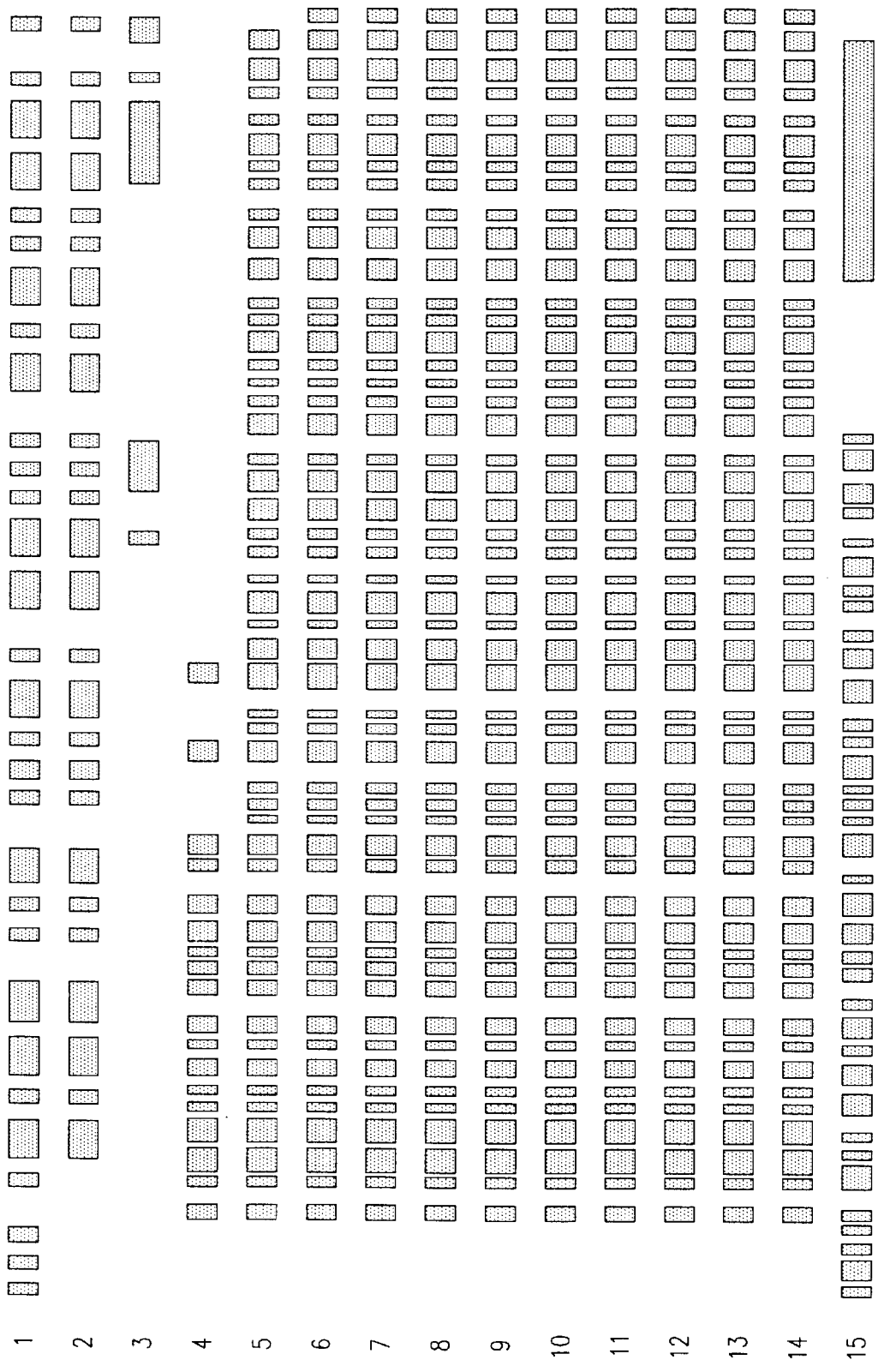
FIG. 6 shows a magnified barcode from FIG. 2B, broken into single scan lines.

FIG. 6 shows the barcode of FIG. 3 as it is receive from the low-resolution camera of FIG. 4, with each scan line (1–15) shown separately. We will now walk through the algorithm with regard to the scanned lines in the same manner that the computer would do. In this example, the program is designed to work with labels that use only the basic code 39 set, without the "$", "/", "+" or "%" characters, so the algorithm checks for two wide and three narrow bars. It would be understood by one of ordinary skill in the art that by checking for other combinations of three wide elements of nine total elements, the algorithm can easily be broadened to accommodate the expanded code 39 codeset.

Starting with scan line 1 of the barcode, the first five bars are accepted, the character width C is set to zero, and the storage area for the label is cleared (step 505). The width of the widest bar is determined (step 510); in this instance the far right bar is the widest. The threshold is set (step 515) and the number of wide and narrow bars is determined (step 520). This window has four narrow and one wide bar, so it is determined (step 525) that this window does not meet the coding scheme. The window is incremented one bar to the right (step 540). Since this is not the end of the scan line (step 570), the algorithm again determines the widest bar (step 510). The widest bar remains the same, although it is in a different position in the window now. After the threshold is set (step 515), it is again determined that the window contains four narrow bars and only one wide bar (step 520). Since this does not meet the coding scheme (step 525), the window is incremented (step 540), end of scan line is check (step 570) and the new window is examined. In this third window, the third and fifth bar are the widest, so their width is determined (step 510), the threshold set (step 515) it is determined that the window contains three narrow and two wide bars (step 520). Since this fits the coding scheme (step 525), this window is checked to determine if this is the start character (step 530), in this case an asterisk, coded as 00110 for bars, 1000 for spaces. The window does not contain the start character, so the width of the character is checked (step 535) against the value of C. No start character has been found, so the width C of a character is still set to zero. The width of the character in the window does not match C, so the window is incremented one bar (step 540) and the process continues.

The reader can determine, by repeating the algorithm along the scan line, that no window on this line will both match the coding criteria and be identified as the start character. Therefore the algorithm will encounter the end of scan line condition (step 570) prior to decoding a label. When the end of scan line is recognized (step 570), the algorithm begins anew.

The results for the second scan line are the same as for the first scan line, with no valid start character found. The third scan line contains only five bars and will be seen as a single window that meets the coding pattern, but which does not contain the start character.

In scan line four of the barcode, the first window is decoded as 00110 for the bars, 1000 for the spaces. This window meets the coding scheme (step 525) and it contains the start character (step 530). The value C of the width of a character is calculated (step 545) as the width of this character and the start character is stored as the first character in the label. The label is not complete (step 555), so the window is incremented by five bars to the next character (step 560). The end of the scan line has not been reached, so the window is decoded (steps 510–520) as 01010 for bars, 0001 for spaces. This fits the coding scheme (step 525) and is not the start character (step 530). When compared, the width of the character is the same as C (step 535), so this character, which decodes as "S", is stored as the second character in the label. The label is not complete (step 555), so the window is incremented to the next character; the end of the scan line has not been reached (step 570), so the window is decoded (steps 510–520) as 00110 for the bars, 0001 for the spaces. This meets the coding scheme (step 525), is not the start character (step 530) and has the correct width (step 535), so the decoded character, a "T" is stored in the label (step 550). The label is not complete (step 555), so the window is incremented to the next character (step 560), but the end of scan line is found (step 570), so the process moves to the next scan line (step 575), sets C to zero and clears the label (step 505).

In the fifth scan line, the first three characters are decoded as they were in scan line four. The algorithm is able to move through the line, decoding successive characters as "*STK015L1"; however the end of the scan line is encountered before an second "*" is found to delimit the end of the label.

Before beginning the sixth scan line, the label is cleared and C is reset to zero. On this sixth scan line, the algorithm finally able to properly decode the label all the way to the end as *STK015L1*. Once it is recognized that the label is complete (step 555), the algorithm declares the label identified.

It is clear from this walk through the algorithm that this process can discard any number of poorly read scan lines, as long as one scan line has not been distorted beyond recognition. In tests using this decoding algorithm, the ability to machine read barcodes with accuracy was greatly improved. Without a reliable decoding system, the use of low-resolution line scan cameras in barcode applications has been problematic, necessitating the use of more expensive camera systems. With the advent of a reliable decoding algorithm, it is possible to use less expensive cameras to achieve the same results.

It is important to note that while the present invention has been described in the context of a method for decoding barcodes, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of reading a barcode, comprising the steps of:
   looking at a segment of said barcode containing a predetermined number of bars;
   assigning a value of wide or narrow to said bars in said segment according to a determination of whether a bar has a width greater or less than a predetermined percentage of the width of the widest bar in said segment;
   if said segment meets a given coding standard, then storing a character represented by said segment as a next character in a decoded label,
   else, moving said segment one bar ahead and returning to said assigning step.

2. The method of claim 1, wherein said predetermined number of bars is five, said predetermined percentage is 75%, and said given coding standard is code 39.

3. The method of claim 1, further comprising, prior to storing said character, the step of:
   if said character is a start/stop character, then determining a valid width for characters,
   else determining if said character meets said valid width.

4. The method of claim 3, wherein, if said character does not meet said valid width, incrementing said window one bar ahead and returning to said assigning step without storing said character.

5. The method of claim 1, further comprising, after storing said character:
   if said decoded label meets a label coding scheme, stopping,
   else incrementing said window by said predetermined number of bars and returning to said assigning step.

6. The method of claim 1, wherein said segment meets the coding standard if it contains two wide bars and three narrow bars.

7. The method of claim 1, wherein said segment meets the coding standard if it contains three wide elements from a total of nine elements, said elements being either bars or spaces.

8. A computer program product on a computer readable media, comprising:
   first instructions for setting a window to look at a segment of a barcode containing a predetermined number of bars;

second instructions for assigning a value of wide or narrow to said bars in said segment according to a determination of whether a bar is greater or less than a given percentage of the width of the widest bar in said segment; and third instructions for determining if said segment meets a given coding standard, wherein, if said segment contains a first number of wide bars and a second number of narrow bars, then storing a character represented by said segment as a next character in a decoded label, else, incrementing said window one bar ahead and returning to said assigning step.

9. The computer program product of claim 8, wherein said predetermined number is five, said given percentage is 75%, said first number is two, said second number is three, and said given coding standard is code 39.

10. The computer program product of claim 9, further comprising, prior to said instructions for storing said character, instructions for:

if said character is a start/stop character, then determining a valid width for characters, else determining if said character meets said valid width.

11. The computer program product of claim 9, wherein, if said character does not meet said valid width, incrementing said window one bar ahead and returning to said assigning step.

12. The computer program product of claim 9, further comprising, after said instructions for storing said character:

instructions for determining if said decoded label meets a label coding scheme, and if so stopping, and instructions for otherwise incrementing said window said predetermined number of bars and returning to said assigning step.

13. The computer program product of claim 9, wherein said third instructions determine that said segment meets the standard if it contains two wide bars and three narrow bars.

14. The computer program product of claim 9, wherein said third instructions determine that said segment meets the coding standard if it contains three wide elements from a total of nine elements, said elements being either bars or spaces.

15. An automated media library comprising:

a plurality of volumes of media, wherein each volume of said plurality of volumes of media has an associated barcode that uniquely identifies said volume;

a mechanism, associated with said plurality of volumes of media, which is connected to transport ones of said plurality of volumes between a storage location and a user location;

a line-scan camera, attached to said mechanism, which is connected to read said associated barcodes; and a processor, connected to receive the output of said line-scan camera, said processor comprising:

first instructions for setting a window to look at a segment of a barcode containing a predetermined number of bars;

second instructions for assigning a value of wide or narrow to said bars in said segment according to a determination of whether a bar is greater or less than a given percentage of the width of the widest bar of said bars in said segment; and third instructions for determining if said segment meets a code standard, wherein if said segment contains a first number of wide bars and a second number of narrow bars, then storing a character represented by said segment as a next character in a decoded label, else, incrementing said window one bar ahead and returning to said assigning step.

16. The automated media library of claim 15, wherein said predetermined number of bars is five, said given percentage is 75%, said first number is two, said second number is three, and said given code standard is code 39.

17. The automated media library of claim 15, further comprising, prior to said instructions for storing said character, instructions for:

if said character is a start/stop character, then determining a valid width for characters, else determining if said character meets said valid width.

18. The automated media library of claim 15, wherein, if said character does not meet said valid width, incrementing said window one bar ahead and returning to said assigning step.

19. The automated media library of claim 15, further comprising, after said instructions for storing said character:

instructions for determining if said decoded label meets a label coding scheme, and if so stopping, and instructions for otherwise incrementing said window said predetermined number of bars and returning to said assigning step.

20. The automated media library of claim 15, wherein, said third instructions determines that said segment meets a code standard if said segment contains three narrow and two wide bars.

21. The automated media library of claim 15, wherein, said third instructions determines that said segment meets a code standard if said segment contains three wide elements out of nine elements, said elements being bars and spaces.

* * * * *